(12) United States Patent
Blease et al.

(10) Patent No.: US 6,585,362 B2
(45) Date of Patent: Jul. 1, 2003

(54) INK COMPOSITION, INK CARTRIDGE HAVING INK COMPOSITION, AND METHOD OF FILLING INK CARTRIDGE

(75) Inventors: James W. Blease, Avon, NY (US); L. Ronald Whitlock, Pittsford, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/971,414

(22) Filed: Oct. 5, 2001

(65) Prior Publication Data

US 2003/0095168 A1 May 22, 2003

(51) Int. Cl.⁷ .............................. B41J 2/19; C09D 11/00
(52) U.S. Cl. ....................................... 347/92; 106/31.65
(58) Field of Search ............................ 347/92, 86, 100; 106/31.32, 31.33, 31.64, 31.65

(56) References Cited

U.S. PATENT DOCUMENTS

| 4,279,653 A | * | 7/1981 | Makishima et al. ...... 106/31.32 |
| 4,361,843 A | | 11/1982 | Cooke et al. .................. 347/99 |
| 4,400,215 A | | 8/1983 | Cooke et al. ............. 106/31.35 |
| 5,683,500 A | | 11/1997 | Kawasumi et al. ......... 106/31.6 |
| 5,833,744 A | | 11/1998 | Breton et al. ............. 106/31.59 |
| 5,849,815 A | * | 12/1998 | Aoki et al. .................. 523/161 |
| 6,145,970 A | * | 11/2000 | Sasaki et al. .................. 347/85 |
| 6,288,156 B1 | | 9/2001 | Hausmann .................. 524/427 |
| 6,315,402 B1 | * | 11/2001 | Kawase ........................ 347/85 |
| 6,399,674 B1 | * | 6/2002 | Kashiwazaki et al. ....... 523/161 |

FOREIGN PATENT DOCUMENTS

| EP | 0 784 085 | 7/1997 |
| EP | 1 052 011 A1 | 11/2000 |
| JP | 93317605 A | 12/1993 |
| JP | 10114875 | 6/1998 |
| WO | WO 00 569620 | 10/2000 |

* cited by examiner

Primary Examiner—Michael Nghiem
(74) Attorney, Agent, or Firm—William R. Zimmerli

(57) ABSTRACT

An ink composition and an ink cartridge having the ink composition are provided. The ink composition includes a colorant and an aqueous carrier, the ink composition having a dissolved gas content of less than 3 ppm as measured on the basis of the amount of dissolved oxygen gas at 20° C. and a static surface tension at 25° C. of greater than 34 dynes/cm. The ink cartridge includes an ink container filled with a liquid ink, the liquid ink having a dissolved gas content of less than 3 ppm as measured on the basis of the amount of dissolved oxygen gas at 20° C. and a static surface tension at 25° C. of greater than 34 dynes/cm. The ink container can be a collapsible bag.

23 Claims, 8 Drawing Sheets

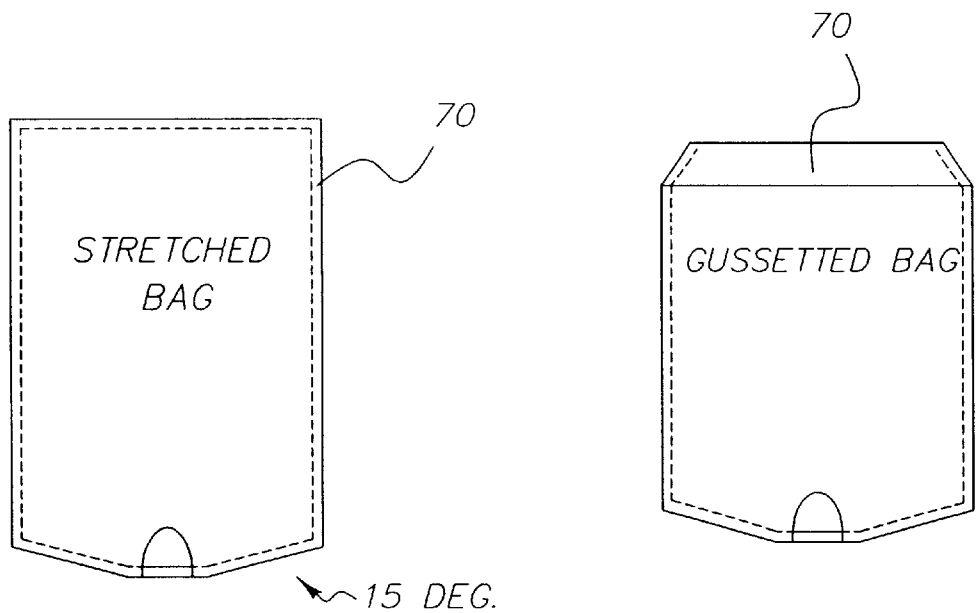
*FIG. 12A*          *FIG. 12B*
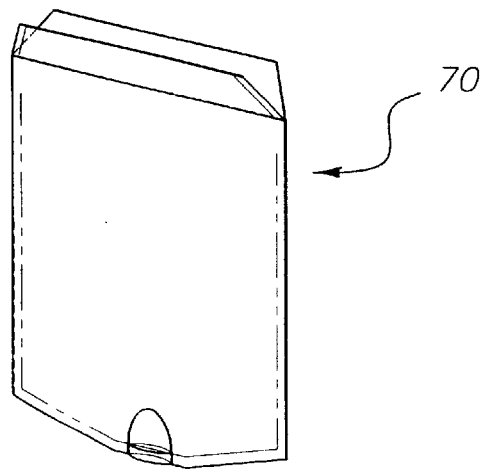
*FIG. 13*

INK COMPOSITION, INK CARTRIDGE HAVING INK COMPOSITION, AND METHOD OF FILLING INK CARTRIDGE

CROSS REFERENCE TO RELATED APPLICATIONS

Reference is made to pending U.S. Ser. No. 09/931,313, now allowed entitled Ink Cartridge With Internal Ink Bag and Method Of Filling, filed in the names of Winfield R. Trafton, Kirk D. Farung and Diana C. Petranek on Aug. 16, 2001.

FIELD OF THE INVENTION

The present invention relates to ink jet printing and, more particularly, to ink compositions used in ink jet printing.

BACKGROUND OF THE INVENTION

Ink jet printing is a non-impact method for producing images by the deposition of ink droplets in a pixel-by-pixel manner to an image-recording element in response to digital signals. There are various methods which may be utilized to control the deposition of ink droplets on the image-recording element to yield the desired image. In one process, known as continuous ink jet, a continuous stream of droplets is charged and deflected in an imagewise manner onto the surface of the image-recording element, while unimaged droplets are caught and returned to an ink sump. In another process, known as drop-on-demand ink jet, individual ink droplets are projected as needed onto the image-recording element to form the desired image. Common methods of controlling the projection of ink droplets in drop-on-demand printing include piezoelectric transducers and thermal bubble formation.

The inks used in the various ink jet printers can be classified as either dye-based or pigment-based. A dye is a colorant, which is dissolved in the carrier medium. A pigment is a colorant that is insoluble in the carrier medium, but is dispersed or suspended in the form of small particles, often stabilized against flocculation and settling by the use of dispersing agents. The carrier medium can be a liquid or a solid at room temperature in both cases. Commonly used carrier media include water, mixtures of water and organic co-solvents and high boiling organic solvents, such as hydrocarbons, esters, ketones, etc.

A requirement in wide format ink jet printers is the delivery of at least 500 ml of ink through a printhead before nozzles begin to fail to fire ink droplets. In order to achieve this, the ink composition is required to have desired physical characteristics including viscosity, surface tension and amount of dissolved gas. The optimized property levels are largely dependent on the printer design and printhead architecture.

During the ink delivery from an ink cartridge to a printer head, minute air bubbles present in the ink or within the ink cartridge gives flow resistance to the ink. In addition, when the ink head is repeatedly pressurized and depressurized during ink ejection, dissolved gases (e.g. dissolved oxygen and dissolved nitrogen) present in the ink tend to stagnate in the ink head causing the printhead to misfire during droplet ejection resulting in reduced printhead reliability. This is particularly true in piezoelectric print heads. Additionally, changes in both ink viscosity and surface tension can cause unreliable droplet ejection or droplet splashing which leads to reduced image quality. Typically, inks having a low surface tension (typically less than 40 mN/m) tend to have a faster drying time when compared to inks having a high surface tension (typically greater than 40 mN/m). However, inks having a high surface tension typically produce images of higher image quality as compared to the images produced by inks having lower surface tension.

U.S. Pat. No. 5,683,500, which issued to Kawasumi et al. on Nov. 4, 1997, optimizes an ink composition used in a writing instrument so as to reduced writing defects including uneven ink density and skips in a drawn line. U.S. Pat. No. 5,833,744, which issued to Breton et al. on Nov. 10, 1998, optimizes an ink composition by adding a paper specific surfactant having a paper pulp debonding agent. U.S. Pat. No. 6,288,156 B1, which issued to Higashiyama et al. on May 8, 2001, optimizes an ink composition for use over a range of temperatures.

An object of the present invention is to optimize the above described physical properties of an ink composition so that desired quantities of ink can be delivered by a printhead to a receiver reliability and consistently over time.

SUMMARY OF THE INVENTION

According to one feature of the present invention, an ink composition has a colorant and an aqueous carrier, wherein the ink composition has a dissolved gas content of less than 3 ppm as measured on the basis of the amount of dissolved oxygen gas at 20° C. and a static surface tension at 25° C. of greater than 34 dynes/cm.

According to another feature of the present invention, an ink cartridge has an ink container filled with a liquid ink, the liquid ink having a dissolved gas content of less than 3 ppm as measured on the basis of the amount of dissolved oxygen gas at 20° C. and a static surface tension at 25° C. of greater than 34 dynes/cm.

According to another feature of the present invention, an ink cartridge has a housing having a front side wall, a back side wall opposite the front side wall, a pair of opposed left and right side walls separating the front and the back side walls, and a bottom wall, the walls defining an internal cavity within the housing. An ink container is located within the internal cavity and filled with a liquid ink, the liquid ink having a dissolved gas content of less than 3 ppm as measured on the basis of the amount of dissolved oxygen gas at 20° C. and a static surface tension at 25° C. of greater than 34 dynes/cm.

According to another feature of the present invention, a method of filling an ink cartridge providing a housing having a front side wall, a back side wall opposite the front side wall, a pair of opposed left and right side walls separating the front and the back side walls, and a bottom wall, the walls defining an internal cavity within the housing; providing an ink container; positioning the ink container within the internal cavity; and filling the ink container with a liquid ink having a dissolved gas content of less than 3 ppm as measured on the basis of the amount of dissolved oxygen gas at 20° C. and a static surface tension at 25° C. of greater than 34 dynes/cm.

BRIEF DESCRIPTION OF THE DRAWINGS

FIG. 12A and FIG. 12B are front side elevational views of the ink bag that is to be positioned in the cartridge and showing respectively the ink bag in a fully stretched condition and the ink bag when it is not stretched; and FIG. 13 is a perspective view of the ink bag.

DETAILED DESCRIPTION OF THE INVENTION

Figure 1A:
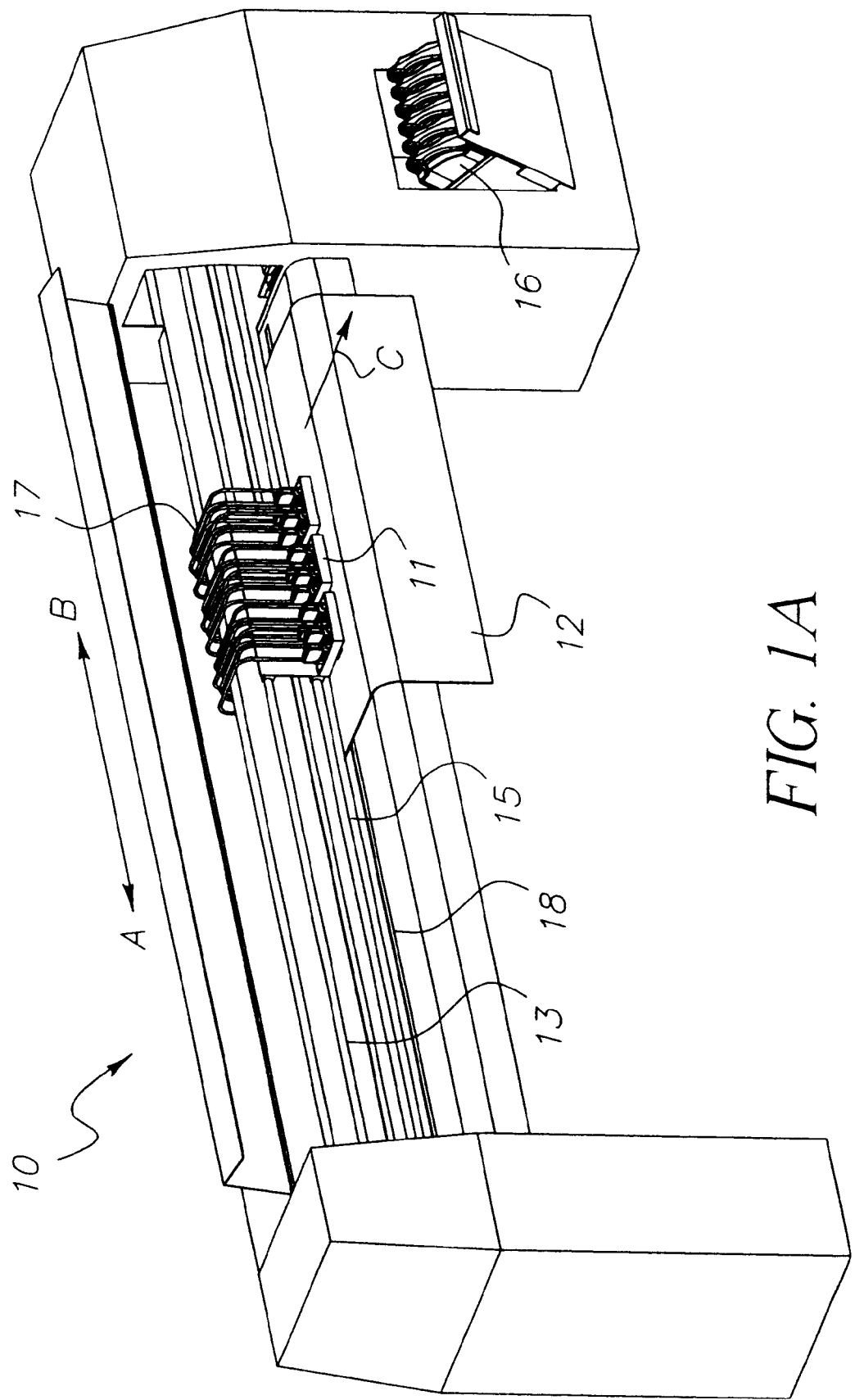
FIG. 1A is a perspective view of an inkjet printer.

The present description will be directed in particular to elements forming part of, or cooperating more directly with, apparatus and methods in accordance with the present invention. It is to be understood that elements not specifically shown or described may take various forms well known to those skilled in the art.

In order to meet the above described ink delivery performance requirements, improve image quality, and improve printer performance, the inventors of the present invention have discovered that it is desirable to reduce the amount of dissolved gas present in an ink composition and maintain the surface tension of the ink composition above a predetermined level. As such, an ink composition of the present invention comprises a colorant and an aqueous carrier, wherein a dissolved gas content of the ink composition is less than 3 ppm as measured on the basis of the amount of dissolved oxygen gas at 20° C. and a static surface tension of the ink composition at 25° C. is greater than 34 dynes/cm. Additionally, ink compositions of this type are particular suited for use in an ink cartridge having an ink container positioned therein, as described below.

The colorant can be a water-soluble dye, a pigment, or any other type of colorant provided the colorant can form a color in a water based ink composition. Additionally, the colorant can have chromatic color or achromatic color. As referred to in this description and as defined in *Measuring Color,* by R. W. G. Hunt, published by Ellis Horwood Limited (1991), the term chromatic color denotes any color exhibiting hue (these colors are distinct from those colors commonly referred to as white, gray, black, neutral, and colorless) while the term achromatic color denotes any color devoid of hue (commonly referred to as white, gray, black, neutral, and colorless colors).

Any water-soluble dye, or combination of dyes, commonly used in an ink composition having an aqueous carrier can be used in this invention, such as reactive dyes, direct dyes, anionic dyes, acid dyes, food dyes and the like, for example, those described in U.S. Pat. No. 5,973,026. Additionally, the water-soluble dye can be a cationic dye or an anionic dye. Examples of cationic dyes include azo dyes, such as quatenized pyrazoleazoaniline dyes, triarylmethane dyes, azine dyes, phthalocyanine dyes, oxazine dyes, thiazine dyes, etc. Examples of anionic dyes include metal-complex dyes, such as transition metal complexes of 8-heterocyclylazo-5-hydroxyquinoline; azo dyes, such as C.I. Direct Yellow 132; phthalocyanine dyes such as C.I. Direct Blue 199; anthraquinone dyes, or anthrapyridone dyes; etc. The exact choice of dye will depend upon the specific application and performance requirements such as color reproduction and image stability.

Any known pigment, or combination of pigments, commonly used in an ink composition having an aqueous carrier can be used in the invention. For example those pigments disclosed in U.S. Pat. Nos. 5,026,427; 5,086,698; 5,141,556; 5,160,370; and 5,169,436. The exact choice of pigments will depend upon the specific application and performance requirements such as color reproduction and image stability. Pigments suitable for use in the present invention include, for example, azo pigments, monoazo pigments, disazo pigments, azo pigment lakes, β-Naphthol pigments, Naphthol AS pigments, benzimidazolone pigments, disazo condensation pigments, metal complex pigments, isoindolinone and isoindoline pigments, polycyclic pigments, phthalocyanine pigments, quinacridone pigments, perylene and perinone pigments, thioindigo pigments, anthrapyrimidone pigments, flavanthrone pigments, anthanthrone pigments, dioxazine pigments, triarylcarbonium pigments, quinophthalone pigments, diketopyrrolo pyrrole pigments, titanium oxide, iron oxide, and carbon black. Typical examples of pigments which may be used include Color Index (C. I.) Pigment Yellow 1, 2, 3, 5, 6, 10, 12, 13, 14, 16, 17, 62, 65, 73, 74, 75, 81, 83, 87, 90, 93, 94, 95, 97, 98, 99, 100, 101, 104, 106, 108, 109, 110, 111, 113, 114, 116, 117, 120, 121, 123, 124, 126, 127, 128, 129, 130, 133, 136, 138, 139, 147, 148, 150, 151, 152, 153, 154, 155, 165, 166, 167, 168, 169, 170, 171, 172, 173, 174, 175, 176, 177, 179, 180, 181, 182, 183, 184, 185, 187, 188, 190, 191, 192, 193, 194; C. I. Pigment Orange 1, 2, 5, 6, 13, 15, 16, 17, 17:1, 19, 22, 24, 31, 34, 36, 38, 40, 43, 44, 46, 48, 49, 51, 59, 60, 61, 62, 64, 65, 66, 67, 68, 69; C. I. Pigment Red 1, 2, 3, 4, 5, 6, 7, 8, 9, 10, 11, 12, 13, 14, 15, 16, 17, 18, 21, 22, 23, 31, 32, 38, 48:1, 48:2, 48:3, 48:4, 49:1, 49:2, 49:3, 50:1, 51, 52:1, 52:2, 53:1, 57:1, 60:1, 63:1, 66, 67, 68, 81, 95, 112, 114, 119, 122, 136, 144, 146, 147, 148, 149, 150, 151, 164, 166, 168, 169, 170, 171, 172, 175, 176, 177, 178, 179, 181, 184, 185, 187, 188, 190, 192, 194, 200, 202, 204, 206, 207, 210, 211, 212, 213, 214, 216, 220, 222, 237, 238, 239, 240, 242, 243, 245, 247, 248, 251, 252, 253, 254, 255, 256, 258, 261, 264; C.I. Pigment Violet 1, 2, 3, 5:1, 13, 19, 23, 25, 27, 29, 31, 32, 37, 39, 42, 44, 50; C.I. Pigment Blue 1, 2, 9, 10, 14, 15:1, 15:2, 15:3, 15:4, 15:6, 15, 16, 18, 19, 24:1, 25, 56, 60, 61, 62, 63, 64, 66; C.I. Pigment Green 1, 2, 4, 7, 8, 10, 36, 45; C.I. Pigment Black 1, 7, 20, 31, 32, and C.I. Pigment Brown 1, 5, 22, 23, 25, 38, 41, 42. In a preferred embodiment of the invention, the pigment is C.I. Pigment Blue 15:3, C.I. Pigment Red 122, C.I. Pigment Yellow 155, C.I. Pigment Yellow 74, bis(phthalocyanylalumino)tetraphenyldisiloxane or C.I. Pigment Black 7.

If a pigment is used as the colorant, a pigment dispersant can be added to the ink composition. Pigment dispersants include water-soluble resins, surface active agents, and the like. Examples of water-soluble resins include natural resins, semi-synthetic resins, synthetic resins, etc. Examples of synthetic resins include alkali-water-soluble resins such as polyacrylic acid resins, polymaleic acid resins, styrene-acrylic acid copolymers and styrene-maleic acid copolymers, water-soluble styrene resins, polyvinyl pyrrolidone, polyvinyl alcohol, water-soluble urethane resins, etc. Examples of surface-active agents include anionic surface-active agents, cationic surface-active agents, nonionic surface-active agents, ampholytic surface-active agents, etc.

Typically, the aqueous carrier for the ink composition is water or a mixture of water and at least one water miscible co-solvent. Selection of a suitable mixture depends on requirements of the specific application, such as desired surface tension and viscosity, the selected pigment or dye, drying time of the ink jet ink, and the type of paper onto which the ink will be printed. Representative examples of water-miscible co-solvents that may be selected include (1) alcohols, such as methyl alcohol, ethyl alcohol, n-propyl alcohol, isopropyl alcohol, n-butyl alcohol, sec-butyl alcohol, t-butyl alcohol, iso-butyl alcohol, furfuryl alcohol, and tetrahydrofurfuryl alcohol; (2) ketones or ketoalcohols such as acetone, methyl ethyl ketone and diacetone alcohol; (3) ethers, such as tetrahydrofuran and dioxane; (4) esters, such as ethyl acetate, ethyl lactate, ethylene carbonate and propylene carbonate; (5) polyhydric alcohols, such as ethylene glycol, diethylene glycol, triethylene glycol, tetraethylene glycol, propylene glycol, polyethylene glycol, glycerol, 2-methyl-2,4-pentanediol 1,2,6-hexanetriol and thioglycol; (6) lower alkyl mono- or di-ethers derived from alkylene glycols, such as ethylene glycol mono-methyl (or -ethyl) ether, diethylene glycol mono-methyl (or -ethyl) ether, diethylene glycol mono-butyl (or -ethyl) ether, propylene glycol mono-methyl (or -ethyl) ether, poly(ethylene glycol) butyl ether, triethylene glycol mono-methyl (or -ethyl) ether and diethylene glycol di-methyl (or -ethyl) ether; (7) nitrogen containing cyclic compounds, such as pyrrolidone, N-methyl-2-pyrrolidone, and 1,3-dimethyl-2-imidazolidinone; and (8) sulfur-containing compounds such as dimethyl sulfoxide, 2,2'-thiodiethanol, and tetramethylene sulfone.

Typically, the amount of aqueous carrier employed is in the range of approximately 70 to 98 weight %, preferably approximately 90 to 98 weight %, based on the total weight of the ink. A mixture of water and a polyhydric alcohol, such as diethylene glycol, is useful as an aqueous carrier. In a preferred embodiment, the inks contain from about 5 to about 60 weight % of water miscible organic solvent. Percentages are based on the total weight of the aqueous carrier.

Water-miscible organic solvents may also be added to the ink composition in order to help the ink penetrate the receiving substrate, especially when the substrate is a highly sized paper. Examples of such solvents include alcohols, such as methyl alcohol, ethyl alcohol, n-propyl alcohol, isopropyl alcohol, n-butyl alcohol, sec-butyl alcohol, t-butyl alcohol, iso-butyl alcohol, furfuryl alcohol, and tetrahydrofurfuryl alcohol; ketones or ketoalcohols such as acetone, methyl ethyl ketone and diacetone alcohol; ethers, such as tetrahydrofuran and dioxane; and esters, such as, ethyl lactate, ethylene carbonate and propylene carbonate.

Other additives which may optionally be present in the ink jet ink compositions include thickeners, conductivity enhancing agents, anti-kogation agents, drying agents, waterfast agents, dye solubilizers, chelating agents, binders, light stabilizers, viscosifiers, buffering agents, anti-mold agents, anti-curl agents, stabilizers and defoamers. Additionally, the ink compositions can include a humectant, a surfactant, a penetrant, a biocide, etc. as is required depending on the application.

A humectant is usually employed in the ink jet compositions of the invention to help prevent the ink from drying out or crusting in the orifices of the printhead. Examples of humectants which can be used include polyhydric alcohols, such as ethylene glycol, diethylene glycol(DEG), triethylene glycol, propylene glycol, tetraethylene glycol, polyethylene glycol, glycerol, 2-methyl-2,4-pentanediol, 2-ethyl-2-hydroxymethyl-1,3-propanediol(EHMP), 1,5 pentanediol, 1,2-hexanediol, 1,2,6-hexanetriol and thioglycol; lower alkyl mono- or di-ethers derived from alkylene glycols, such as ethylene glycol mono-methyl or mono-ethyl ether, diethylene glycol mono-methyl or mono-ethyl ether, propylene glycol mono-methyl or mono-ethyl ether, triethylene glycol mono-methyl, mono-ethyl or mono-butyl ether (TEGMBE), diethylene glycol di-methyl or di-ethyl ether, poly(etbylene glycol) monobutyl ether (PEGMBE), and diethylene glycol monobutylether(DEGMBE); nitrogen-containing compounds, such as urea, 2-pyrrolidinone, N-methyl-2-pyrrolidinone, and 1,3-dimethyl-2-imidazolidinone; and sulfur-containing compounds such as dimethyl sulfoxide and tetranethylene sulfone, etc.

Preferred humectants for the inks of the invention include DEG, glycerol, DEGMBE, TEGMBE, 1,2-hexanediol, 1,5-pentanediol, urea, 2pyrrolidinone, EHMP and mixtures thereof. The humectant may be employed in each ink in an amount of from about 5 to about 60 weight percent.

Surfactants may be added to the ink to adjust the surface tension to an appropriate level. The surfactants may be anionic, cationic, amphoteric or nonionic and used at levels of 0.01 to 1% of the ink composition. Preferred surfactants include Surfynol® 465 (available from Air Products Corp.) and Tergitol® 15-S-5 (available from Union Carbide).

A penetrant (0–10% by weight) may also be added to the ink composition employed in the process of the invention to help the ink penetrate the receiving substrate, especially when the substrate is a highly sized paper. A preferred penetrant for the inks of the present invention is n-propanol at a final concentration of 1–6% by weight.

A biocide may be added to the ink composition employed in the invention to suppress the growth of microorganisms such as molds, fungi, etc. in aqueous inks. A preferred biocide for the ink composition employed in the present invention is Proxel® GXL (Avecia Corp.) at a final concentration of 0.0001–0.5 wt. %.

The pH of the aqueous ink compositions employed in the invention may be adjusted by the addition of organic or inorganic acids or bases. Useful inks may have a preferred pH of from about 2 to 10, depending upon the type of dye being used. Typical inorganic acids include hydrochloric, phosphoric and sulfuric acids. Typical organic acids include methanesulfonic, acetic and lactic acids. Typical inorganic bases include alkali metal hydroxides and carbonates. Typical organic bases include ammonia, triethanolamine (TEA) and tetramethylethlenediamine.

A typical ink composition employed in the invention may comprise, for example, the following components by weight: colorant (0.05–20%), water (20–95%), a humectant (5–70%), water miscible co-solvents (2–20%), surfactant (0.1–10%), biocide (0.05–5%) and pH control agents (0.1–10%). Examples of ink compositions made in accordance with the present invention include the following.

Example Ink Formulations

| Ink | Dye(s) | Wt. % Dye(s) | Wt. % glycerol | Wt. % DEG | Wt. % PEG MBE | t. % TEA |
|---|---|---|---|---|---|---|
| Ex. 1 Cyan | Avecia Projet Fast Cyan 2 | 3.6 | 9.5 | 12.5 | 7.0 | 0.9 |
| Ex. 2 Magenta | Nippon Kayaku JPD-EK1, Sensient Reactive Red 31 | 3.00 0.86 | 9.0 | 11.5 | 7.5 | 0.9 |
| Ex. 3 Yellow | Avecia Projet Yellow 1G | 4.0 | 15.5 | 3.0 | 9.0 | 0.9 |
| Ex. 4 Black | Clariant Duasyn KRL-SF | 5.0 | 8.0 | 11.25 | 8.5 | |
| Ex. 5 Light Cyan | Avecia Projet Fast Cyan 2 | 1.2 | 11.75 | 13.5 | 7.0 | 0.5 |
| Ex. 6 Light Magenta | Nippon Kayaku JPD-EK1, Sensient Reactive Red 31 | 0.9 0.24 | 11.3 | 13.5 | 7.5 | 0.3 |
| Ex. 7 Cyan | Avecia Projet Fast Cyan 2 | 3.0 | 5.5 | 5.5 | 11.0 | 1.3 |
| Ex. 8 Cyan | Avecia Projet Fast Cyan 2 | 3.0 | 9.5 | 9.5 | 3.0 | 1.3 |
| Ex. 9 Cyan | Avecia Projet Fast Cyan 2 | 3.0 | 15.5 | 15.5 | 11.0 | 1.3 |
| Ex. 10 Cyan | Avecia Projet Fast Cyan 2 | 3.0 | 19.5 | 19.5 | 3.0 | 1.3 |

Comparative Examples

Comparative examples 1 through 6 correspond to Examples 1 through 6 having a dissolved gas content of the ink composition was greater than 3 ppm as measured on the basis of the amount of dissolved oxygen gas at 20° C.

| | | |
|---|---|---|
| Com. Ex. 7 | Epson Cyan Ink T410 (for the Epson Stylus Pro 9000 Printer) | |
| Com. Ex. 8 | Epson Cyan Ink T502 (for the Epson Stylus Pro 10000 Printer) | |

| Inks | Dye(s) | Wt. % Dye(s) | Wt. % 2-pyrrolidinone | Wt. % 1,2-hexanediol |
|---|---|---|---|---|
| Com. Ex. 9 Black | Clariant Duasyn KRL-SF | 12.0 | 12.0 | 6.0 |

Testing Procedures

Ink viscosity can be measured by any suitable means known in the art. For the ink compositions of the invention and the comparative examples, a temperature controlled capillary viscometer was used. The viscometer employs an electronic balance to collect the ink that leaves the capillary tube so that a mass flow rate at steady state can be determined. The capillary tube is made from glass and has a diameter of 0.1 centimeter and is temperature controlled by a water jacket. All ink measurements were made at 25 ° C.

Ink viscosity is calculated from the Poiseuille equation shown below.

$$\mu = \frac{\rho^2 g (h + L) \pi D^4}{128 L q}$$

In the equation, $\mu$ is the ink viscosity, g is the gravitational constant, h is the height of the liquid sample above the capillary tube, L is the length of the capillary tube, D is the diameter of the capillary tube, $\rho$ is the density of the ink to be tested and q is the average mass flow rate of the ink.

Measurement of dissolved gas ($O_2$ and $N_2$) in the ink compositions of the invention can be accomplished using a gas chromatography method described in Table 1 and accompanying text set forth below.

TABLE 1

| | |
|---|---|
| Material | Inks (dye and pigment) |
| Test(s) | $O_2$ and $N_2$ (ug/g Ink) |
| Column | J & W Scientific Molesieve (30 m x 0.53 mm x 25.0 um) |
| Instrument | Agilent 6890 GC with manual Purge and Trap device |
| Temperature Gradient | Initial Temperature (° C.): 30, Initial Time (min): 5.5; Rate (° C./min): 15, Temperature (° C.): 60; Rate (° C./min): 30, Final Temperature (° C.): 250; Final Time (min): 4 |
| Purge and Trap (liquid $N_2$) | Purge Time (min): 5.5, Trap Time (min): 5.5 |
| Detector Temperature (° C.) | 300° C. |
| Gases | Carrier: Helium, Pressure (psi): 12 psi, Split flow (ml/min): 60 (empty purge vessel), Makeup (ml/min): 7 (constant), Reference (ml/min): 20 |
| Detector | Thermal Conductivity (TCD) |
| Integrator | Agilent ChemStation (Version A.06.01) |

Standard Preparation: Inject 10, 20, 30, and 50 uL of Air into Purge vessel (through septum) using a gas tight syringe. Quantification is based on a method of external standards. Background air ($O_2$, $N_2$) is determined by placing a section of the column in liquid $N_2$ for 5.5 min. $O_2$ and $N_2$ areas in the background are then subtracted from that of the standards and samples.

Sample Preparation: Pierce septum of ink bag with the needle of a 2 mL VICI Pressure Lok syringe, withdraw 0.5 mL ink, and then discard ink. Re-pierce septum and draw 1.3 mL of ink into the syringe. Lock in the sample by pushing the red button until it stops against the front sleeve. Remove needle from syringe tip and attach syringe to Purge vessel. Open purge and syringe valves and push 0.3 mL of sample (until 1.0 mL mark) into the purge vessel, then close valves. This step removes the air present between the syringe and the purge vessel. Wait approximately 1 min after air elutes from the column and then insert a section of the column into a dewar of liquid $N_2$. Immediately open purge and syringe valves and add remaining sample (1.0 mL) to the purge vessel. Purge/trap time is 5.5 mL. After 5.5 min, remove column from the dewar of liquid $N_2$. Switch purge valve to "blow out" sample after the completion of the chromatographic run. Component $O_2$ can be identified based on the retention time of approximately 6.5 minutes while component $N_2$ can be identified based on the retention time of approximately 6.8 minutes.

Alternatively, measurement of dissolved oxygen ($O_2$) in the ink compositions of the invention can be accomplished using a dissolved oxygen (DO) meter described in Table 2 and accompanying text set forth below.

TABLE 2

| Material | Inkjet Inks |
|---|---|
| Test Instrument | Dissolved Oxygen Concentration, $O_2$, PPM Mettler-Teledo Model 4100 Meter-equipped with oxygen sensing electrode Model 6100. Available from Mettler-Toledo Process Analytical, Inc, Woburn MA. |
| Calibration | Room air and high purity Helium |
| Sample | Ink cartridge |

Calibration Procedure: Single point calibration of Model 4100 DO meter is done according to the recommended procedure of suspending the DO probe in air and adjusting the digital read out to 8.5 PPM O2. A two-point calibration is the run using the same procedure with an added step of adjusting the zero PPM O2 concentration while suspending the DO probe in a stream of high purity He.

Sample Preparation: The degassed ink sample is contained in a flexible plastic laminate pouch housed in a sealed plastic cartridge. The plastic cartridge is cut opened sufficiently to expose one end of the plastic pouch. The pouch is then cut open only sufficiently to allow insertion of the metal DO probe.

Sample Measurement Procedure: With an occasional very gentle stirring action using the probe itself inside the pouch, a steady-state DO reading is taken after approx. 10–20 minutes.

Alternative Sample Measurement Procedure: The ink can be drained from cartridge for measurement by insertion of a needle into the pouch through its septum or pouch wall. The needle is attached to a short section of flexible tubing which in turn is attached to a "T" housing available from Mettler-Toledo (Model no. 724DO2). The "T" housing holds the DO probe in such a way as to allow the ink to flow past the tip without contacting the ambient atmosphere. After approx. 30–50 ml of ink has flowed through the "T" housing an accurate and reproducible O2 measurement can be taken.

Static surface tension of the ink can be measured by any suitable means known in the art. For the ink compositions of the invention and the comparative examples, a temperature controlled surface tension apparatus employing the Wilhemy plate method was used. Such an apparatus is the K 10 ST Digital Tensiometer manufactured by Kruss GmBH. All inks were measured at 25° C. Ink surface tension is calculated from the equation shown below.

$$\sigma = \frac{P_w}{l_b \cos\theta}$$

In the equation, $\sigma$ is the static surface tension, $P_w$ is the measured force, $l_b$ is the wetting length (40 mm for the Kruss tensionmeter) and $\theta$ is the contact angle between the plate and the ink. The viscometer automatically determines the static surface tension of the sample ink when operated according to the manufacturer's procedure.

Results

Ink compositions having various dissolved gas levels, surface tensions, and viscosities were tested by firing the ink compositions through a BROTHER piezoelectric type drop on demand ink jet printhead. A successful test result occurred when 67 pL ink droplets of the ink composition were continuously fired through the printhead at a rate of 7,500 drops/second for at least 5 minutes without nozzle failure or ink droplet misdirection. The results are described in the table below.

| Ink comp. | Package Types | Dissolved Oxygen ppm | Viscosity @ 25° C. cp | Surface tension dynes/cm | Test Results |
|---|---|---|---|---|---|
| Ex. 1 | Bag | <3 | 2.9 | 40 | OK |
| Ex. 2 | Bag | <3 | 2.8 | 39 | OK |
| Ex. 3 | Bag | <3 | 2.9 | 39 | OK |
| Ex. 4 | Bag | <3 | 2.8 | 39 | OK |
| Ex. 5 | Bag | <3 | 2.8 | 39 | OK |
| Ex. 6 | Bag | <3 | 2.8 | 39 | OK |
| Ex. 7 | N/A | <3 | 2.3 | 36 | OK |
| Ex. 8 | N/A | <3 | 2.0 | 44 | OK |
| Ex. 9 | N/A | <3 | 4.4 | 36 | OK |
| Ex. 10 | N/A | <3 | 4.2 | 43 | OK |
| Com Ex. 1 | Bag | >3 | 2.9 | 40 | Failed |
| Com Ex. 2 | Bag | >3 | 2.8 | 39 | Failed |
| Com Ex. 3 | Bag | >3 | 2.9 | 39 | Failed |
| Com Ex. 4 | Bag | >3 | 2.8 | 39 | Failed |
| Com Ex. 5 | Bag | >3 | 2.8 | 39 | Failed |
| Com Ex. 6 | Bag | >3 | 2.8 | 39 | Failed |
| Com Ex. 7 | Bag | 0.4–0.6 | 3.3 | 33 | Failed |
| Com Ex. 8 | Bag | 0.3 | 3.1 | 29 | Failed |
| Com Ex. 9 | N/A | <3 | 2.4 | 34 | Failed |

The ink compositions have physical properties compatible with a wide range of ink ejecting conditions, i.e., driving voltages and pulse widths for thermal ink jet printing devices, driving frequencies of the piezo element for either a drop-on-demand device or a continuous device, and the shape and size of the nozzle.

The viscosity of the ink compositions of the present invention is controlled to fall in a range from 2.0 to 10 cps and preferably from 2.5 to 3.5 cps. When the viscosity is lower than 2.0 cps, poor droplet ejection occurs resulting in multiple randomly sized dots in irregular locations on the printed media. When the viscosity is higher than 10 cps, the printhead's ability to eject a droplet is reduced increasing the possibility of permanent nozzle clogging.

The surface tension of the ink compositions of the present invention is greater than 34, preferably from 34 mN/m to 45 mN/m, and more preferably from 36 to 40 mN/m. When the surface tension is lower than the above described range, the printhead failed to fire continuously for at least 5 minutes. Although a preferred embodiment has a surface tension range of from 36 to 40 mN/m, the surface tension can be higher than 40 mN/m. When the surface tension exceeds 40 mN/m, the droplet's ability to penetrate the receiver can be reduced and the overall drying time of the image can be increased.

The amount of dissolved gas of the ink jet ink of the present invention is controlled to be no greater than 3.0 ppm as measured on the basis of the amount of dissolved oxygen gas at 20° C. and preferably no greater than 1.0 ppm. When the amount of dissolved gas is higher than the above described range, the printhead failed to fire continuously for at least 5 minutes.

Figure 1C:
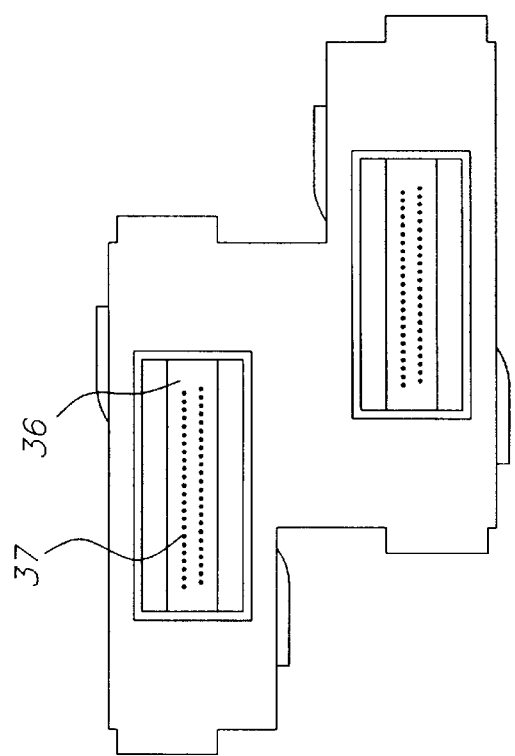
FIG. 1C is a plan view illustrating the nozzle plate for the printhead of FIG. 1B.
Figure 1B:
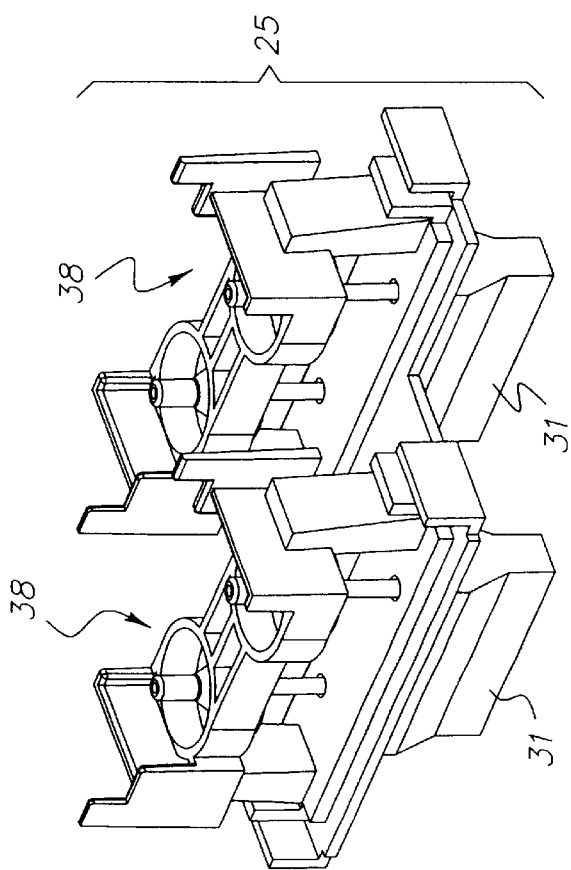
FIG. 1B is a perspective view showing an inkjet printhead used in he printer of FIG. 1A.
Figure 4:
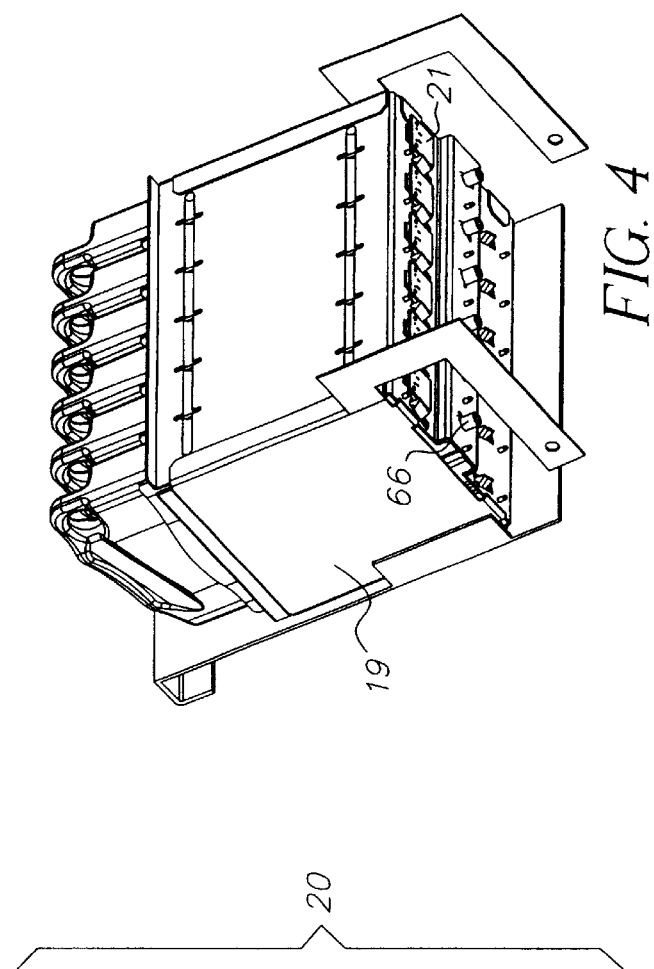
FIG. 4 is another perspective view of the ink cartridge receiver assembly used in the printer of FIG. 1.

Referring to FIGS. 1A–C, an embodiment of a printer 10 that is adapted to accept a plurality of the ink cartridges, each cartridge having an ink composition described above as a main ink supply. The printer includes a carriage 11 that supports an ink jet print head for movement during printing. The ink jet print head is mounted on a print head module 25 (FIG. 1B) which in turn is mounted to the carriage 11. The carriage 11, is coupled through a timing belt 13 with a drive motor (not shown), is reproducibly movable along the width of a recording medium 12 (in the directions of arrows A and B in the FIG. 1A), while being guided by a guide member 15. The ink jet print head 31 receives ink from the ink tank or cartridge 16 through an ink supply tube 17. An intermediate supply of ink may be provided between the ink cartridge and printhead, and thus the ink cartridge may be considered a bulk supply of the ink of a particular color for the printer. A sheet transport roller 18, when driven by a drive motor (not shown), transports the recording medium 12 in the direction (of arrow C in the FIG. 1A) perpendicular to the moving direction of the carriage 11.

A Raster Image Processor controls image manipulation and the resultant image file is delivered to the printer via a remotely located computer through a communications port. On board memory stores the image file while the printer is in operation.

FIGS. 1B and IC show an embodiment of a piezoelectric print head module or assembly 25. However, the ink cartridge may be used with other drop-on-demand print heads such as thermal inkjet print heads and continuous inkjet print heads. Reference numeral 36 designates a nozzle plate having nozzle openings 37 formed therein. Numeral 38 indicates an ink supply port through which ink flows from the ink cartridges 16 via the ink supply tube 17. The firing rate of the print head 31 can be switched between 7.5 kHz and 15 kHz depending on the selection of image resolution and print quality. The carriage velocity is fixed in all print modes.

With reference to FIGS. 2–6 there is shown a printer main ink supply 19 that includes a plurality of different color ink containing ink cartridges 16 and ink cartridge receiver assembly 20 that includes individual cartridge receiving receptacles for receiving each cartridge. Six ink cartridges 16 are positioned in the assembly housing of the ink cartridge receiver assembly such that they are each separated by a divider wall or spacer wall 23 that forms a part of the receiver assembly. The ink cartridge 16 is comprised of a housing 50 with a non-symmetrical curvaceous profile 51, integrated hand hold features or handle 53, cartridge alignment features 52, ink cartridge color identifier or color or ink type discrimination structure 60, and a memory chip assembly 55. An ink bag 70 is also supported within the cartridge and contains ink of a particular color. Typically, the ink color used may be cyan, magenta, yellow and black. Different shades of one or more of these colors may also be provided. Thus, for example, there may be provided cartridges with different shades of cyan. A spot color may also be provided, thus providing an option for use of a very particular color.

The cartridge housing includes an ink receiving cavity, and the housing is defined by a front side wall 90, a back side wall 91 opposite the front side wall, a left side wall 94 and a right side wall 93, the left side wall and the right side wall each respectively establishing a spacing between the front side wall and the back side wall. A bottom wall 95 is also provided from which ink is removed from the ink cartridge. The front side wall and the back side wall are curved so that an outer surface of one has a generally convex curvature and the outer surface of the other has a concave curvature. A plurality of alignment recesses or features 52 are formed on the surfaces of the cartridge housing. A first alignment recess 52 is formed on the outer surface of the front side wall and a pair of alignment recesses 52 are formed on the outer surface of the back side wall. The three alignment recesses are formed adjacent to the bottom wall and the first alignment recess is located substantially midway between the pair of alignment recesses in the width-wise direction of the ink receiving cavity. It will be noted from the figures that the recesses 52 are each relatively elongated in the direction of the height of the cartridge and this is advantageous since the cartridge is inserted with the bottom of the cartridge moving towards the bottom of the ink cartridge receiving receptacle. Therefore, the elongation of the recesses are in the direction of insertion of the cartridges into a respective receptacle. The walls of the ink cartridge are relatively rigid to provide a rigid cartridge structure.

Figure 6:
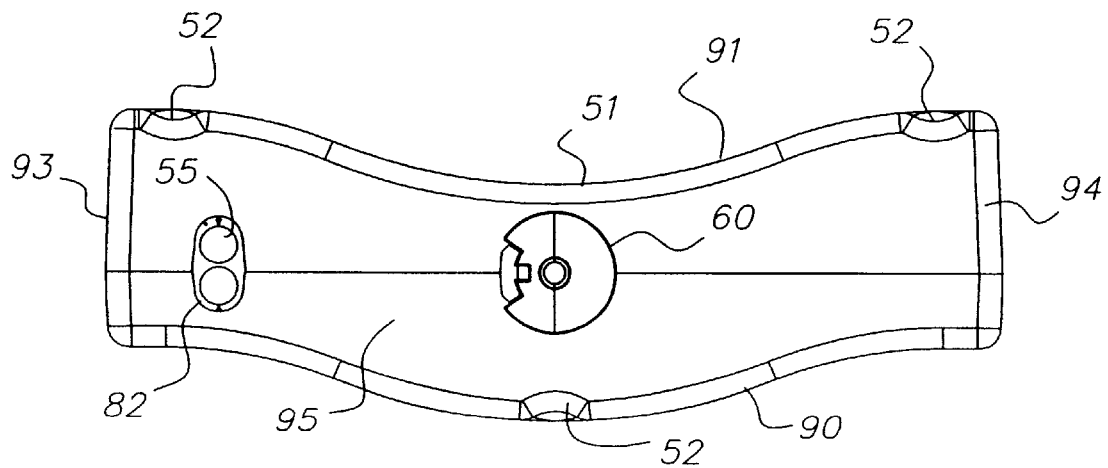
FIG. 6 shows a bottom view of the ink cartridge.
Figure 7:
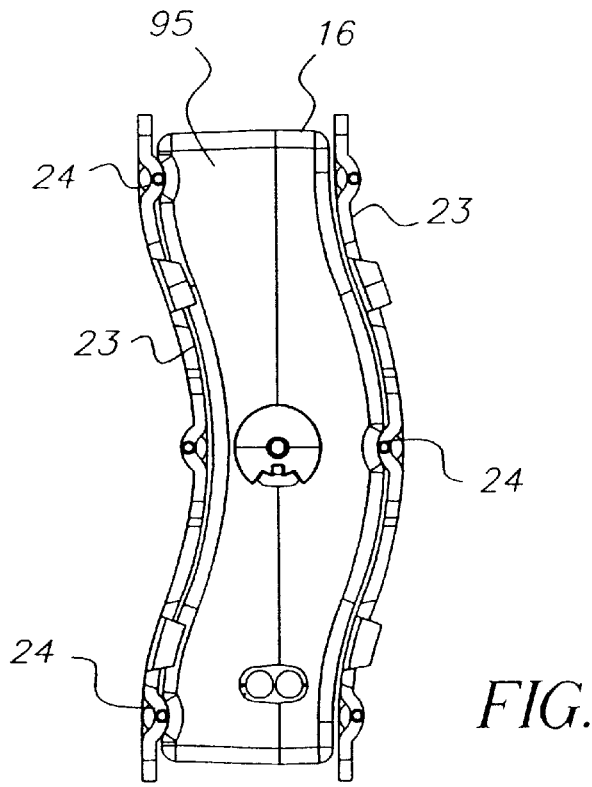
FIGS. 7 and 8 show ink cartridge alignment features engaging with the separators in the ink cartridge receiver assembly.
Figure 8:
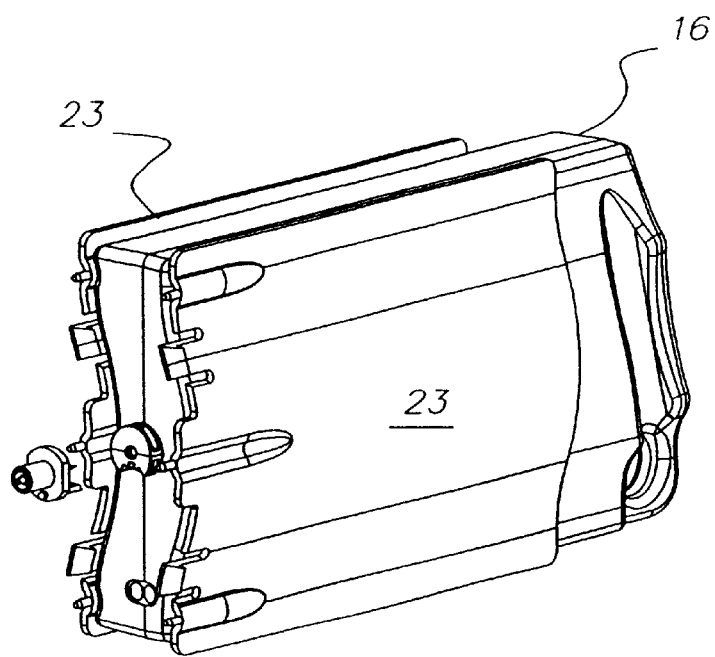

A plurality of identical spacer walls spaced equally from each other in the assembly housing also have cartridge alignment structures 24 thereon (see also FIGS. 6 and 7). Each spacer wall 23 has a curvature to receive a cartridge having a generally complementary curvature to the curvature of the spacer wall. Adjacent spacer walls 23 define a cartridge receiving receptacle and have facing surfaces wherein the location of alignment structures 24 are not identical since the alignment recesses on the front and back surfaces of the cartridge are not identical.

The curvaceous profile 51 of the cartridge 16 is comprised of various radii and appears in a wave shape. This shape can be other non-rectangular shapes such that when nested with other cartridges the orientation of insertion is unidirectional. The provision of a curved shape to the ink cartridge provides a visual aid in describing the proper orientation of the ink cartridge before insertion. The general shape of the cartridge and that of the cartridge receiving receptacle forming a part of the cartridge receiver assembly prevents the cartridge from being inserted incorrectly. This permits electrical contacts forming a part of the memory chip assembly to be aligned with electrical contact members 21 (FIG. 4) in the receptacles of the cartridge receiver assembly 20. The curvaceous profile 51 also stabilizes the ink cartridge when in storage by providing nesting action as cartridges are stacked one on top of the other.

Figure 3:
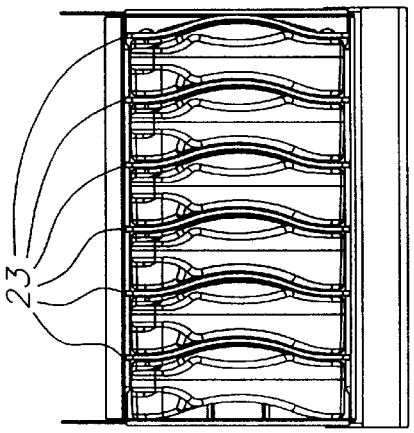
FIG. 3 is a top plan view of the ink cartridge receiver assembly of FIG. 2.
Figure 2:
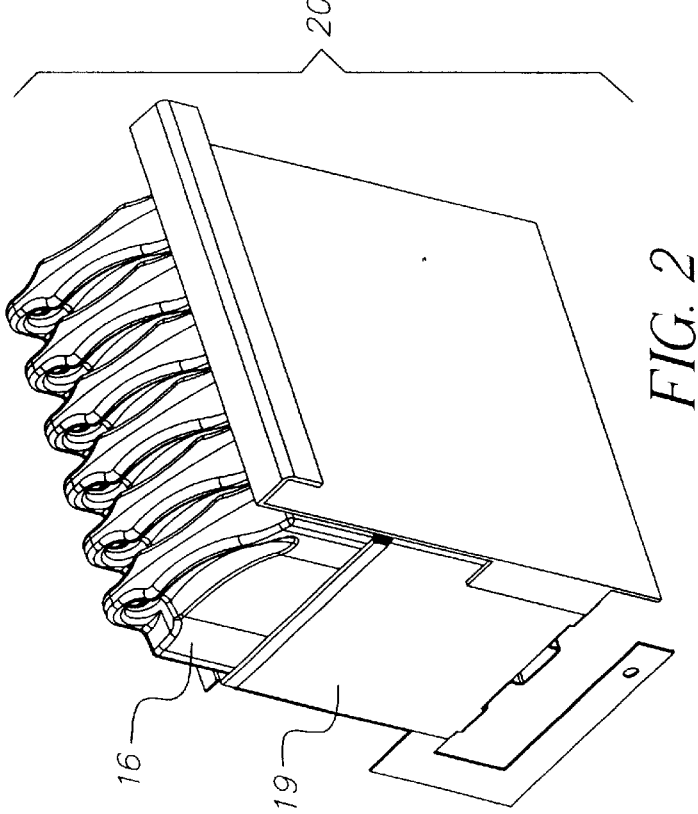
FIG. 2 is a perspective view of an ink cartridge receiver assembly used in the printer of FIG. 1.
Figure 5:
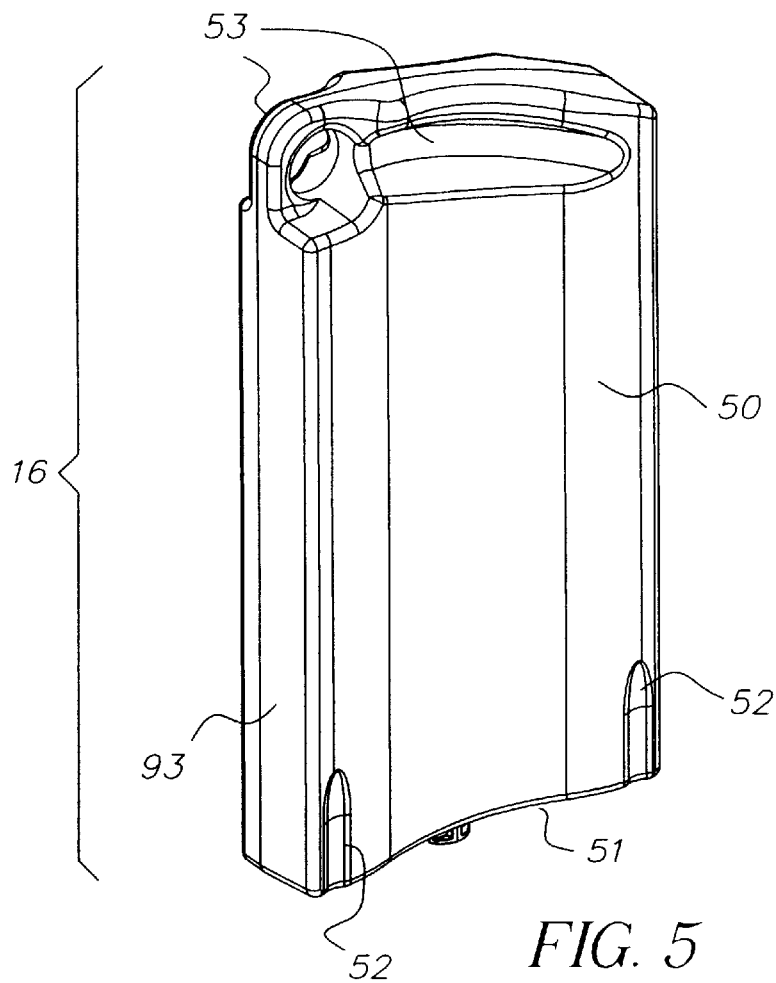
FIG. 5 is a perspective view of an ink cartridge.
Figure 9A:
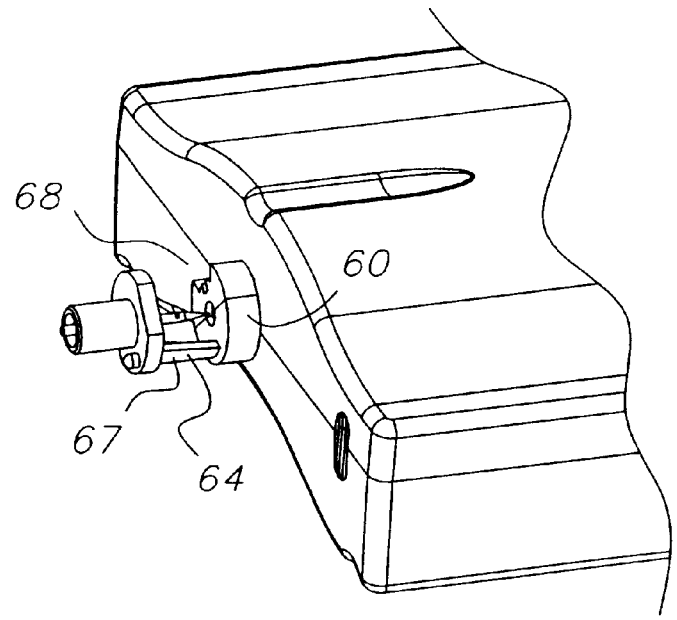
FIGS. 9A and 9B show how the color identifier keyway and color identifier key tab interface when the ink cartridge is placed in the receiver assembly.
Figure 9B:
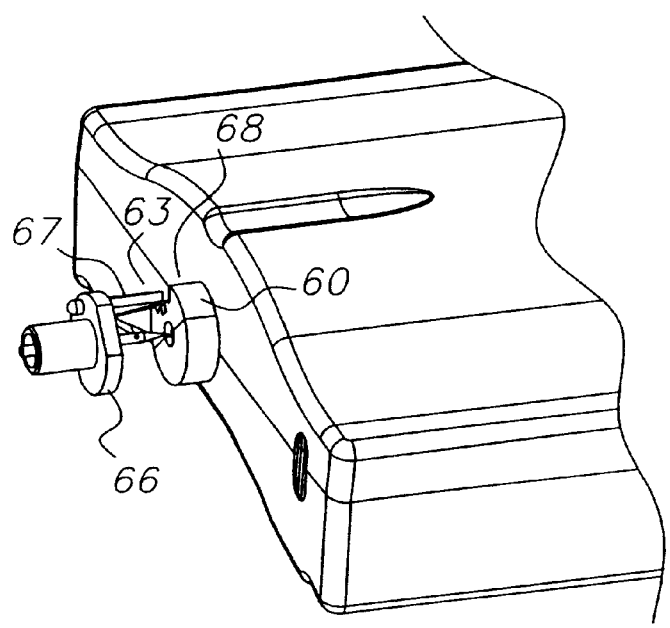
Figure 10:
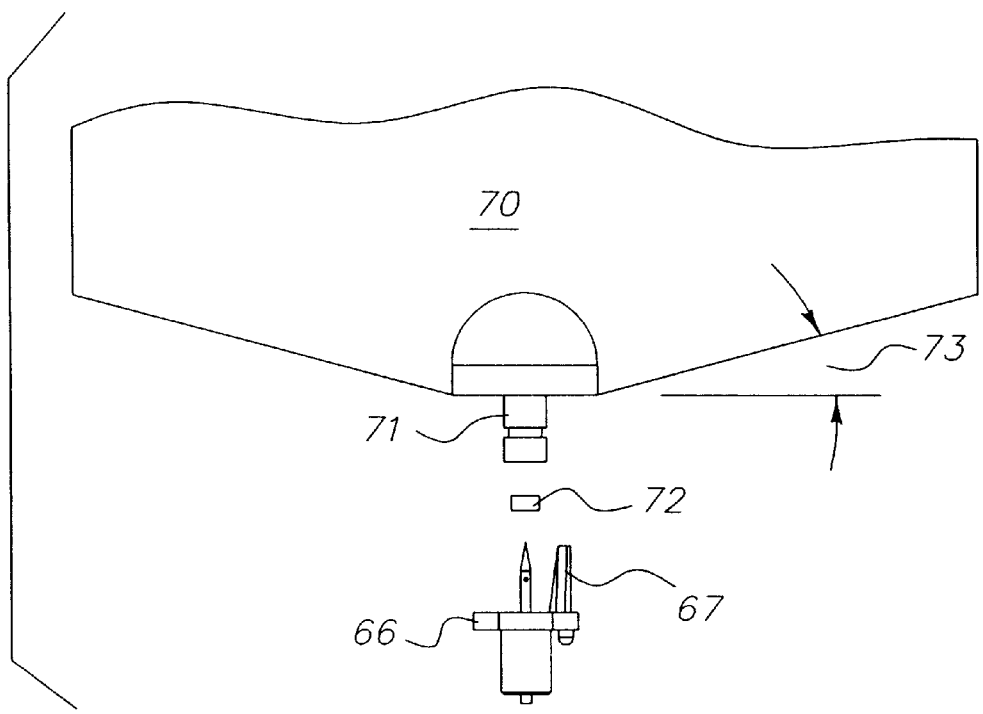
FIG. 10 is an exploded view showing an ink bag, fitment and the septum and ink withdrawal needle which needle forms part of a receptacle in the cartridge receiver assembly.

The ink cartridge housing (FIGS. 5, 6) includes integral alignment features 52 that are molded into the plastic cartridge that mate or cooperate with location structures or features formed in the receptacles of the ink cartridge receiver assembly 19 (FIG. 3). The opening of each receptacle is significantly larger than the ink cartridge allowing for easy insertion. The ink cartridge's alignment features 52 engage with mating location features 24 on the divider or spacer walls 23 (FIG. 7) as the ink cartridge 16 is being inserted into the proper receptacle of the ink cartridge receiver assembly 19. Engagement of these features occurs before the receptacle's ink color identifier key and needle approach the cartridge fitment 71 and septum 72 (FIG. 10). These features align the ink cartridge 16 such that the hollow needle 74 aligns with and pierces the septum 72. The cartridge alignment features 52 also align the ink cartridge such that the electrical contact members 21 (FIG. 4) of each cartridge receiving receptacle are positioned to engage the counterpart electrical contacts 58 of memory chip assembly 55 (FIGS. 13A and 13B) on the ink cartridge 16. It is important to note that the divider walls 23, the ink cartridge housing 50 (FIG. 5) and color identifier (color or ink type discrimination structure) 60 are the same parts used repeatedly in the ink cartridge assembly 20. The difference from one color cartridge to the next is the orientation difference of the color identifier 60 in concert with the orientation difference of the color identifier key tab 67 (see FIGS. 9A and 9B) from one cartridge receiving receptacle to another cartridge receiving receptacle. This design therefore minimizes the manufacturing cost of the ink cartridge assembly 20 by using a minimum number of unique components.

With reference to FIGS. 10, 19A and, 19B, and 13 illustrate details regarding the construction of the ink bag 70 that is located within the cartridge. The fitment 71 is thermally sealed to the bag material. The flexible ink bag material is composed of three layers with adhesive between each layer. Each layer has a specific purpose by providing either compatibility with the ink, low water vapor and gas permeability, or abrasion resistance. The inside layer, in contact with the ink, is either a linear low density or low density polyethylene. The fitment is made from either a low-density or a high-density polyethylene thereby promoting good adhesion of it to the bag during the thermal welding process. The middle layer is aluminum foil providing low water vapor and gas permeability, and the outer layer is either nylon or polyethylene terepthalate having high strength and abrasion resistance. The septum 72 is inserted into the circular opening of the fitment 71. The inside diameter of the circular opening of the fitment is smaller than the outside diameter of the septum creating a slight compression of the septum once inserted into the fitment. Once assembled, the bag, fitment and septum must allow for an efficient filling and evacuation process. A feature to the function of the ink bag is the taper angle 73 illustrated in FIG. 10.

It is important to minimize the amount of trapped air remaining in the bag once filled with ink. If air remains in the bag it will dissolve into the ink between the time of manufacture and usage. Dissolved gases in the ink will come out of solution during the firing process of the piezoelectric print head and form air bubbles. Air bubbles, being compressible, will prevent the nozzles from expelling a drop of ink onto the print media 12. The taper angle 73 helps expedite the evacuation of air in the bag during the filling process and allow for a majority of the ink to drain from the bag during usage.

During the filling process the bag is evacuated of air before ink is injected into it. When the ink bag is full the remaining air, now near the fitment and septum, is evacuated. If the taper angle is not present the air tends to become trapped in the corners of the bag and can not be evacuated. The angle allows the remaining air to move to the fitment and thereby allows for its removal. The taper angle 73, which is formed from the area of the bag near the fitment and tapers to a vertical side edge of the bag should be between 5 and 45 degrees. In the preferred embodiment a taper angle of 15 degrees is provided.

Figure 11:
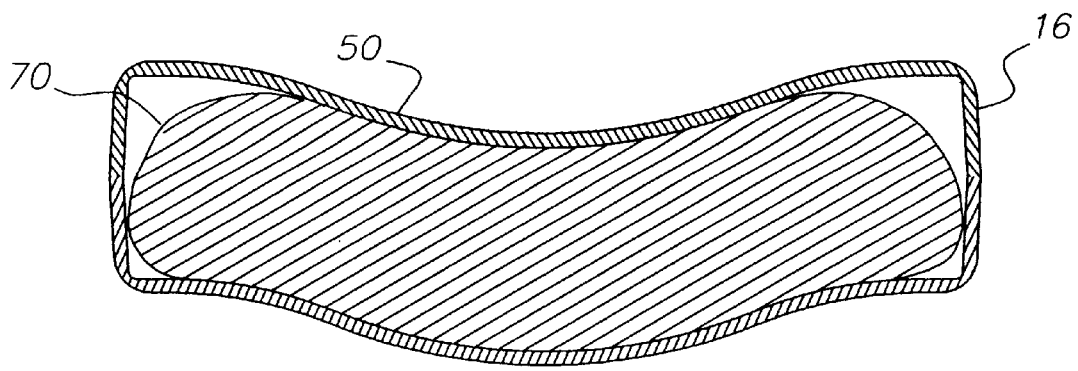
FIG. 11 is a schematic of a cross-section of the ink cartridge illustrating support by the internal surfaces of the ink cartridge of the filled ink bag.

Another contributor to the performance of the ink bag is the relationship between the cartridge housing size and shape and the size and shape of the bag 70. When the ink bag is full of ink (see FIG. 11), and contained within the ink cartridge housing 50, the ink bag is constrained by four interior sides of the ink cartridge housing 50. Therefore the capacity of the ink bag within the ink cartridge housing is driven by the optimization of the size of the ink cartridge housing 50. Key to this optimization is the aspect ratio of the ink cartridge housing size, which in turn drives the size of the ink bag 70.

The method utilized in the assembly of the ink cartridge is benefited by the design. The advantage of sizing the ink bag and cartridge housing according to the relationships stated above allows for the assembly of the ink bag to the cartridge housing before the ink filling process is initiated. The process of assembly includes evacuating the ink bag of air, laying the first half of the cartridge housing on its side, placing color identification components around the fitment of the ink bag, and inserting the ink bag into the first housing using two sided tape. The insertion of the bag is made such that the empty ink bag is conformed to the profile of the first housing half, taped in place using double-sided tape, and then covered with the second housing half. The first and second housings halves are then ultrasonically welded together. The ultrasonic welding process providing a low cost assembly method although other known methods may be used.

Once the housing assembly is welded, the ink bag is filled with a known amount of ink (for example, 1100 mL) while lying on its side and by placing a needle through the septum and pumping ink through the needle and into the ink bag. The cartridge assembly is then turned vertically such that the fitment and septum are facing up. The cartridge may be bumped to cause air in the ink to rise to the top of the bag. The remaining air and about 5 mL of ink are then removed from the bag by applying a vacuum through the needle. At this point the ink bag is fully constrained by the housing and the surface of bag is in intimate contact with the four inside surfaces of the housing assembly as illustrated in the horizontal sectional view shown in FIG. 11. This prevents the bag from shifting during transport. If shifting were to occur then the bag surface could potentially abrade and rupture resulting in ink leakage. If the ink bag was filled prior to the ultrasonic welding process it may also become abraded from the welding process and subsequently rupture. The method of assembly and the configuration of the housing in concert with the ink bag together result in a low cost ink cartridge assembly. As may be noted from FIG. 11 at the section shown there is a uniform internal cartridge cavity thickness spacing between corresponding points on the respective internal surfaces of the front and back side walls even though the front and back sides are curved as are their internal surfaces. The front and backsides are curved complementary; for example one is generally concave in curvature and the other is generally convex in curvature, but internally they maintain a generally uniform spacing between corresponding points on the internal surfaces at least along a certain section through the cartridge.

The ink compositions are degassed prior to filling. During the degassing process, ink is pumped to a degassing unit and cycled until the ink reaches a desired gas level. Once reaching the desired gas level, the ink is ready for the filling process. The degassing unit may incorporate known mechanisms for removing dissolved gases from an ink. These include, but are not limited to, physical processes such as boiling and evacuation, and chemical processes such as incorporating gas absorbents in the inks. Furthermore, additional heating, vibration, and evacuation methods can also be incorporated. These include, for example, the use of microwave energy as described in U.S. Pat. Nos. 5,341,162 and 6,089,702; the use of ultrasonic wave generator as described in U.S. Pat. Nos. 3,904,392 and 5, 373,212; and the use of a gas-permeable hollow fiber membrane as described in EP 1052011A1 and JP 05-317605 A2; a commercially available Liquid-Cel membrane cartridge manufactured by Celgard KK. Alternatively, other degassing processes can be used.

Although it is preferable to incorporate a collapsible bag in the ink cartridge, non-collapsible bags, or rigid ink containers can also be used provided the level of dissolved gas in the ink composition remains substantial constant. Additionally, printers using cartridges having ink bags that are sealed and not vented to the atmosphere but instead collapse as the ink is used have advantages over printers using other types of ink cartridges, for example, cartridges that vent to the atmosphere or incorporate additional components (e.g. an ink absorbing sponge) into the ink cartridge. Using an ink cartridge having a collapsible bag allows the low level of dissolved gas in the ink composition to be maintained during printing. This can be contrasted with an ink cartridge that vents to the atmosphere which allows the level of dissolved gas in the ink composition to increase over time once the ink cartridge is connected to the printer. This, in turn, can lead to degraded ink performance during printing. Additionally, if additional components are incorporated into the ink cartridge, small pieces or particles of the incorporated component can break away causing contamination of the ink. This may eventually cause nozzles to become clogged, degrading the quality of the image produced.

The invention has been described in detail with particular reference to certain preferred embodiments thereof, but it will be understood that variations and modifications can be effected within the spirit and scope of the invention.

What is claimed is:

1. An ink cartridge comprising:
    a housing having a front side wall, a back side wall opposite the front side wall, a pair of opposed left and right side walls separating the front and the back side walls, and a bottom wall, the walls defining an internal cavity within the housing;
    an ink container located within the internal cavity and filled with a liquid ink, the liquid ink having a dissolved gas content of less than 3 ppm as measured on the basis of the amount of dissolved oxygen gas at 20° C. and a static surface tension at 25° C. of greater than 34 dynes/cm and less than 40 dynes/cm, wherein the liquid ink comprises a colorant, the colorant including a pigment.

2. The ink cartridge according to claim 1, wherein the ink container is a bag.

3. The ink cartridge according to claim 2, wherein the bag is a collapsible bag.

4. The ink cartridge according to claim 2, wherein so that the bag when filled with the liquid ink contacts the front side wall, the back side wall and each of the pair of opposed left and right side walls and the bottom wall.

5. The ink cartridge according to claim 1, wherein the dissolved gas content is less than 1.0 ppm as measured on the basis of the amount of dissolved oxygen gas at 20° C.

6. The ink cartridge according to claim 1, wherein the surface tension is between about 36 dynes/cm to less than 40 dynes/cm.

7. The ink cartridge according to claim 1, wherein the liquid ink has a viscosity at 25° C. greater than 2.5 cp.

8. The ink cartridge according to claim 7, wherein the viscosity at 25° C. is between about 2.5 and 3.5 cp.

9. An ink composition comprising:
    a colorant and an aqueous carrier, wherein the ink composition has a dissolved gas content of less than 3 ppm as measured on the basis of the amount of dissolved oxygen gas at 20° C. and a static surface tension at 25° C. of greater than 34 dynes/cm and less than 40 dynes/cm, wherein the colorant includes a pigment.

10. The ink composition according to claim 9, wherein the dissolved gas content is less than about 1.0 ppm as measured on the basis of the amount of dissolved oxygen gas at 20° C.

11. The ink composition according to claim 9, wherein the surface tension is between about 36 dynes/cm to less than 40 dynes/cm.

12. The ink composition according to claim 9, wherein the liquid ink has a viscosity at 25° C. greater than 2.5 cp.

13. The ink composition according to claim 12, wherein the viscosity at 25° C. is between about 2.5 and 3.5 cp.

14. The ink composition according to claim 9, wherein the colorant has chromatic color.

15. A method of filling an ink cartridge comprising:
    providing a housing having a front side wall, a back side wall opposite the front side wall, a pair of opposed left and right side walls separating the front and the back side walls, and a bottom wall, the walls defining an internal cavity within the housing;
    providing an ink container;
    positioning the ink container within the internal cavity; and
    filling the ink container with a liquid ink having a dissolved gas content of less than 3 ppm as measured on the basis of the amount of dissolved oxygen gas at 20° C. and a static surface tension at 25° C. of greater than 34 dynes/cm and less than 40 dynes/cm, wherein the liquid ink comprises a colorant, the colorant including a pigment.

16. The method according to claim 15, wherein the container is a collapsible bag.

17. The method according to claim 15, wherein the dissolved gas content is less than 1.0 ppm as measured on the basis of the amount of dissolved oxygen gas at 20° C.

18. The method according to claim 15, wherein the surface tension is between about 36 dynes/cm to less than 40 dynes/cm.

19. The method according to claim 15, wherein the liquid ink has a viscosity at 25° C. greater than 2.5 cp.

20. The method according to claim 19, wherein the viscosity at 25° C. is between about 2.5 and 3.5 cp.

21. An ink cartridge comprising:
    an ink container filled with a liquid ink, the liquid ink having a dissolved gas content of less than 3 ppm as measured on the basis of the amount of dissolved oxygen gas at 20° C. and a static surface tension at 25° C. of greater than 34 dynes/cm and less than 40 dynes/cm, wherein the liquid ink comprises a colorant, the colorant including a pigment.

22. The ink cartridge according to claim 21, wherein the ink container is a bag.

23. The ink cartridge according to claim 22, wherein the bag is a collapsible bag.

* * * * *